United States Patent
Piramoon

(10) Patent No.: US 6,296,798 B1
(45) Date of Patent: *Oct. 2, 2001

(54) PROCESS FOR COMPRESSION MOLDING A COMPOSITE ROTOR WITH SCALLOPED BOTTOM

(75) Inventor: Alireza Piramoon, Santa Clara, CA (US)

(73) Assignee: Piramoon Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/300,094

(22) Filed: Apr. 27, 1999

Related U.S. Application Data

(62) Division of application No. 09/039,584, filed on Mar. 16, 1998, now abandoned.

(51) Int. Cl.[7] .............................. B29C 43/18; B29C 70/34
(52) U.S. Cl. ........................ 264/257; 264/258; 264/277; 264/324; 494/16; 494/81
(58) Field of Search ..................................... 264/257, 258, 264/277, 324; 494/12, 16, 20, 31, 33, 43, 81, 85; 74/572, 574

(56) References Cited

U.S. PATENT DOCUMENTS

| | | | |
|---|---|---|---|
| 4,820,257 | * | 4/1989 | Ishimaru ................................ 494/16 |
| 4,824,429 | * | 4/1989 | Keunen et al. ......................... 494/16 |
| 5,362,301 | * | 11/1994 | Malekmadani et al. ................ 494/16 |
| 5,411,465 | * | 5/1995 | Glen et al. ............................... 494/16 |
| 5,643,168 | * | 7/1997 | Piramoon et al. ...................... 494/16 |
| 5,776,400 | * | 7/1998 | Piramoon et al. ...................... 264/219 |
| 5,833,908 | * | 11/1998 | Piramoon et al. ...................... 264/250 |
| 5,942,068 | * | 8/1999 | Adams et al. .......................... 156/112 |
| 6,033,612 | * | 3/2000 | Adams et al. .......................... 264/258 |
| 6,056,910 | * | 5/2000 | Fritsch et al. .......................... 264/319 |

* cited by examiner

Primary Examiner—Jan H. Silbaugh
Assistant Examiner—Stefan Staicovici
(74) Attorney, Agent, or Firm—Townsend and Townsend and Crew LLP

(57) ABSTRACT

A compression molded fixed angle carbon fiber centrifuge rotor and method for forming the centrifuge rotor are provided. My prior art technique of compression molding is utilized in which a frustum fixed angle rotor body is formed between mold parts. As before, sample tube aperture cores are clustered from the apex end of the mold in that array which duplicates the intended number, size, and angularity of the sample tubes desired in the finished rotor. The bottom boundary of the rotor mold has no longer has a substantially planar boundary; instead the bottom of the rotor mold is supplied with a series of scallops, these scallops being equal in number to the sample tube aperture tubes. The shape at the bottom boundary of the rotor is maintained to give a substantially uniform thickness between the sample tube apertures and the exterior bottom surface of the rotor. Sufficient thickness of material is maintained to resist natural load of sample within the sample tube apertures.

3 Claims, 6 Drawing Sheets

PROCESS FOR COMPRESSION MOLDING A COMPOSITE ROTOR WITH SCALLOPED BOTTOM

This application is a Division of application Ser. No. 09/039,584, filed Mar. 16, 1998, now abandoned.

This invention relates to centrifuge rotors. More specifically, this invention relates to so-called fixed angle compression molded carbon fiber centrifuge rotors with scalloped bottoms. This construction enables lighter construction, easier balancing, accumulation of lesser kinetic energy during centrifuging, and an improved exterior appearance.

BACKGROUND OF THE INVENTION

Carbon fiber centrifuge rotors are known. Accordingly to my earlier U.S. Pat. No. 5,643,168 entitled Compression Molded Composite Material Fixed Angle Rotor issued Jul. 1, 1997 to Piramoon et al, mixed carbon fiber (about 60%) and resin (about 40%) are compression molded to form a net shaped central rotor body with integrally formed sample tube apertures. Typically, this body is frustum shaped between an apex end and a base end. The sample tube apertures are symmetrically arranged about the spin axis of the rotor body and open to the apex end of the rotor. The sample tube apertures extend angularly outward to their closed bottom ends, these ends being near the base end of the rotor and more distant from the spin axis of the rotor than the openings of the sample tube apertures at the apex end. The generally frustum shaped rotor body is provided with circular peripheral steps, these steps being configured to receiving windings. The rotor is wound with continuous carbon fiber at the steps and finished by machining and painting.

It is highly desirable to reduce the weight of a centrifuge rotor to the maximum extent. This is a primary reason why carbon fiber rotors are utilized; they are 40% lighter than their metal equivalents.

Scalloped rotors are known. Until this disclosure, these rotors have all been constructed from carefully machined metal billets. In the case of metal centrifuge rotors, producing differing exterior contours only requires machining. Scalloped bottom metal rotors are known to have problems. Specifically, their lightened metal construction must be constantly inspected for failure. Further, such rotors are now manufactured with carefully machined and dimensioned thin sections which "fuse", the rotor. When breakage is observed at the fused section, the rotor is taken out of service.

Machining of carbon fiber interferes with its structural integrity. For this reason, scalloped rotor constructions have not been utilized with carbon fiber. Instead, carbon fiber rotors have thus far been compression molded without scallops.

DISCOVERY OF A PROBLEM

I have extensively produced compression molded carbon fiber rotors. An example of the produced carbon fiber rotor is set forth in now U.S. Pat. No. 5,643,168 entitled Compression Molded Composite Material Fixed Angle Rotor issued Jul. 1, 1997 to Piramoon et al. I have discovered that compression molding of the rotors there described can cause cracking—especially as the rotors are molded in larger sizes.

This cracking appears at the bottom of the rotor after it is utilized. The cracking does not cause catastrophic failure of the rotor—as it would in a metal rotor—in that the circumferential windings of the rotor maintain the structural integrity of the rotor.

Unfortunately, as of this date, most rotors used are still made from metal. Users are trained to instantly reject rotors with any kind of surface cracking—even carbon fiber rotors. Because of this training on the part of extant users, it is important to eliminate any appearance of cracking on rotors.

Having discovered this occasional problem, I have tried to identify the causes of this occasional cracking. I therefore list what may be some of the reasons for these occasional occurrences.

First, in compression molding of regular shaped carbon fiber rotors, some areas in the bottom half of the rotor have relative massive amounts of compression molded carbon fiber material. Other areas—especially those areas adjacent the sample tube apertures—have much lesser thicknesses of molded carbon fiber material. I believe that the migration of the fibers under the considerable forces of compression molding is non-uniform. For example, it is not uncommon to use hydraulic presses generating as much as 125tons of pressure over a mold to produce the compressed carbon fiber rotor bodies. As the materials compression molded constitute about 60% fiber and 40% resin, this non-uniformity leads to both non-uniform curing and non-uniform density of the finished product.

The reader will understand that the discovery of a problem, as well as the solution to the problem, can constitute invention. This being the case, I claim invention both in the discovery of the problem—as well as its solution.

SUMMARY OF THE INVENTION

A compression molded fixed angle carbon fiber centrifuge rotor and method for forming the centrifuge rotor are disclosed. My prior art technique of compression molding is utilized in which a frustum fixed angle rotor body is formed between mold parts. As before, sample tube aperture cores are clustered from the apex end of the mold in that array which duplicates the intended number, size, and angularity of the sample tubes desired in the finished rotor. The bottom boundary of the rotor mold has no longer has a substantially planar boundary; instead the bottom of the rotor mold is supplied with a series of scallops, these scallops being equal in number to the sample tube aperture tubes. The shape at the bottom boundary of the rotor is maintained to give a substantially uniform thickness between the sample tube apertures and the exterior bottom surface of the rotor. Sufficient thickness of material is maintained to resist natural load of sample within the sample tube apertures. This has been found to produce a more uniformly molded part, prevent the referred to stress cracking, further reduce the weight of the rotors compared with their metal counterparts, and reduce the totality of material which is molded. Necessary balancing is easily accomplished in the vicinity of the scallops. The scalloped rotor bottom is provided with a compression molded carbon fiber cover to prevent windage—this cover not requiring painting. As a result, a superior carbon fiber fixed angle rotor body is compression molded.

DESCRIPTION OF THE PREFERRED EMBODIMENT

Figure 1A:
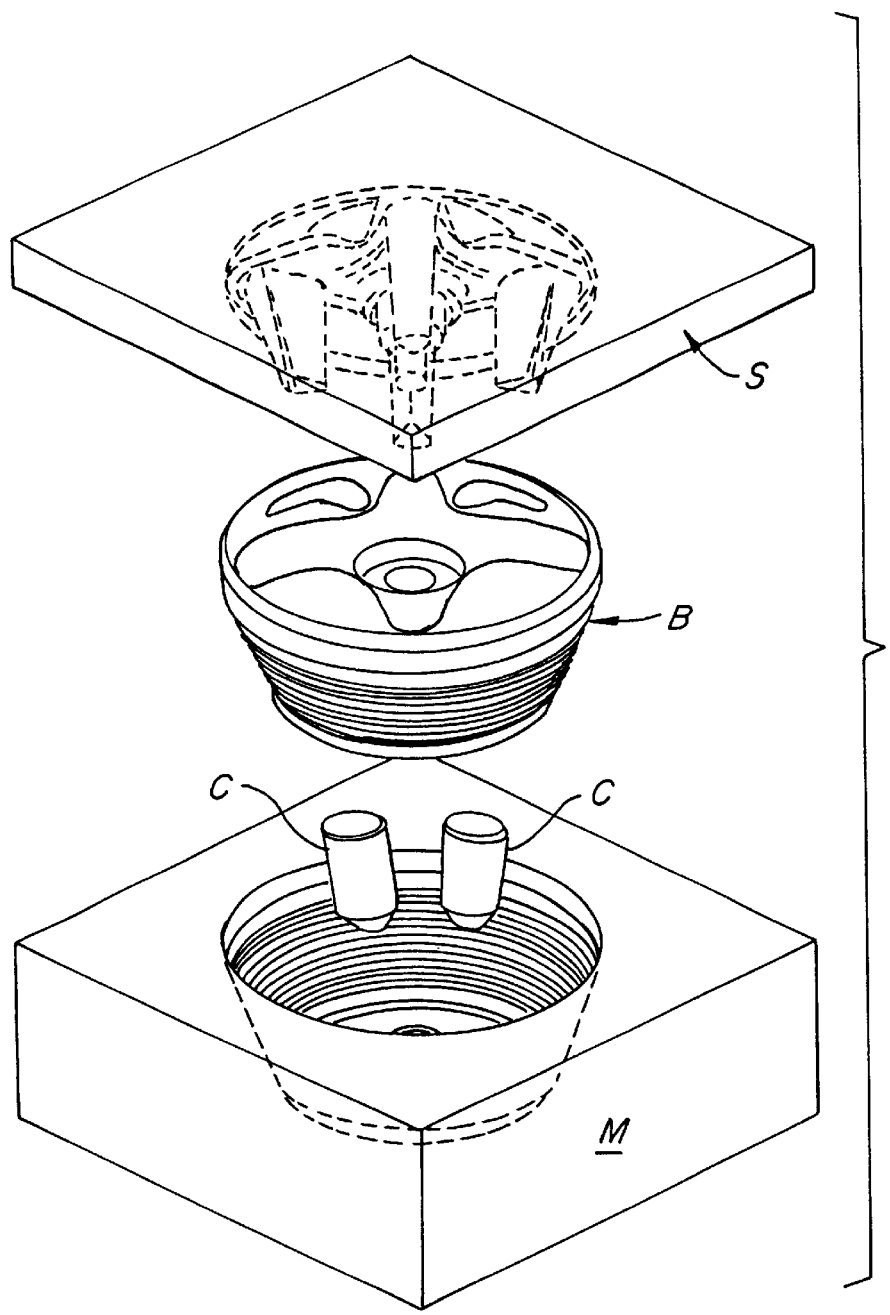
FIG. 1A is an exploded perspective illustrating from bottom to top the mold member defining the frustum shaped cavity, the molded article in between, and the overlying scallop forming member having the protruding scallop forming members shown in broken lines to illustrate that they are hidden from view.
Figure 1B:
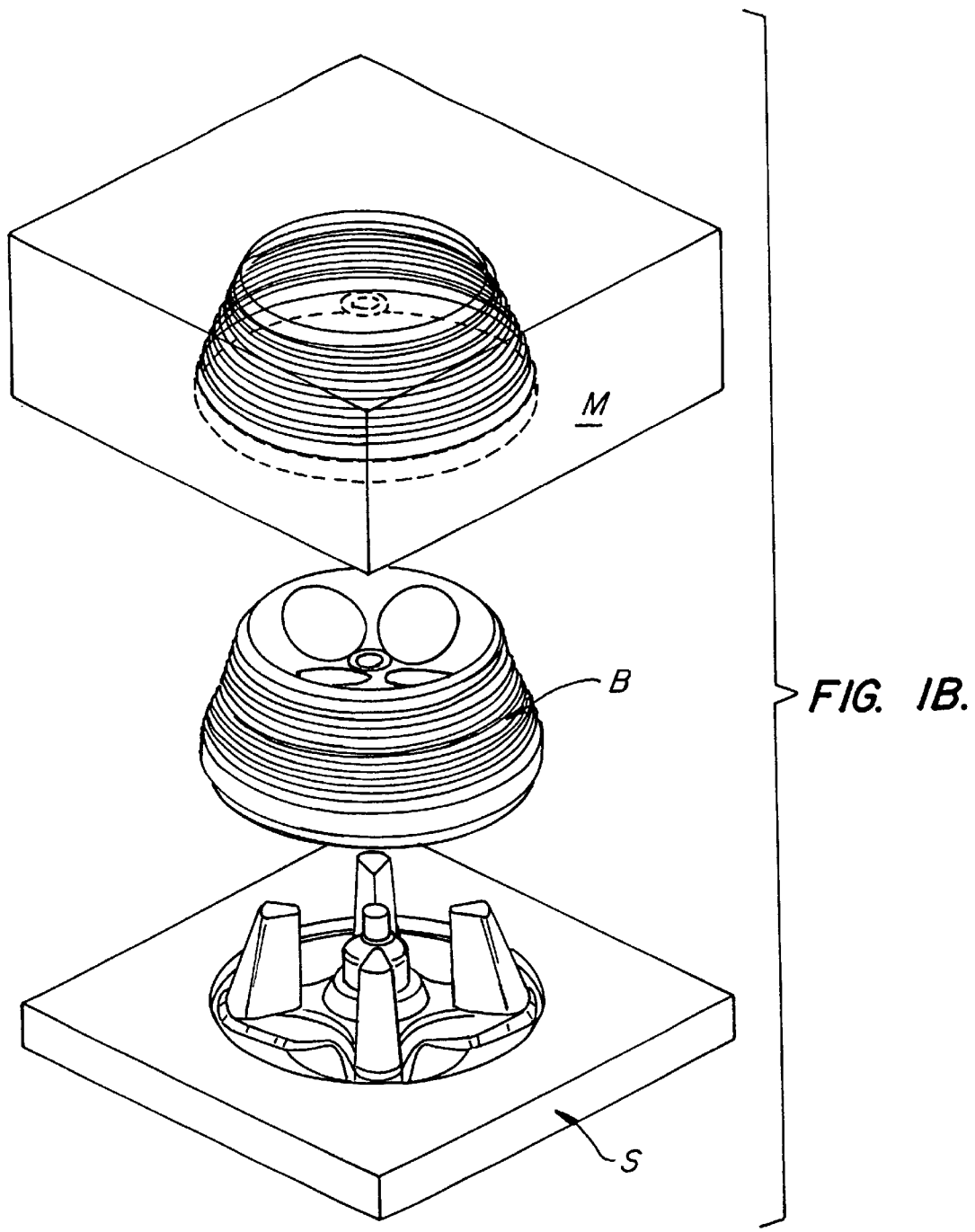
FIG. 1B is an exploded perspective inverted from the view of FIG. 1A illustrating from bottom to top the scallop forming member, the molded article in between, and the overlying mold member having the frustum shaped cavity hidden from view.
Figure 2A:
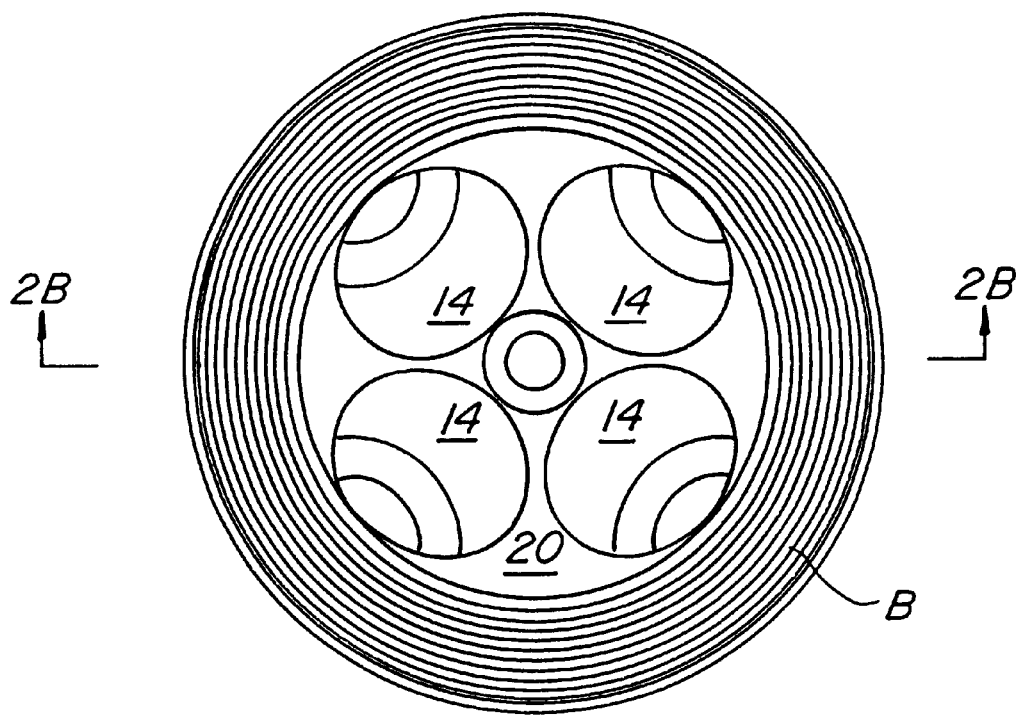
FIG. 2A is a top plan view of the molded rotor shown with cured windings and illustrating the view of the sample tube apertures which a laboratory technician would see from the top of the rotor.
Figure 2B:
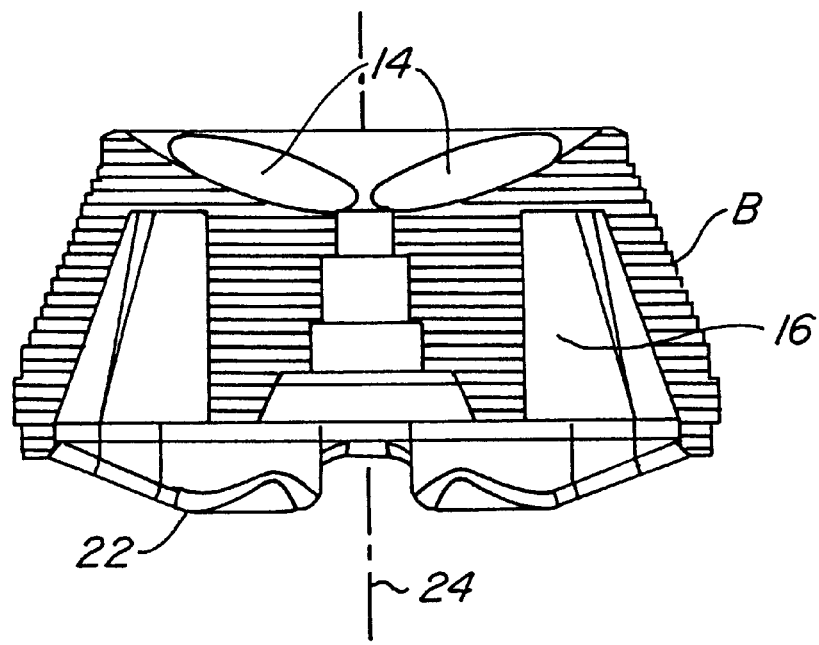
FIG. 2B is a section taken through the rotor body without the windings illustrating a section between the four illustrated sample tube apertures displaying the scalloped profile of the rotor.
Figure 3A:
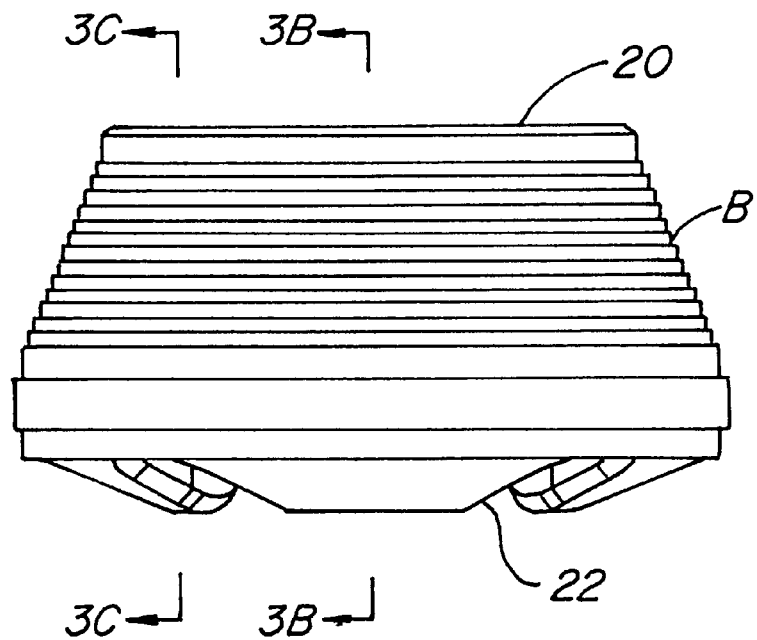
FIG. 3A is a side elevation of the finished rotor body with the cover shown in exploded relation relative to the scalloped rotor bottom.
Figure 3B:
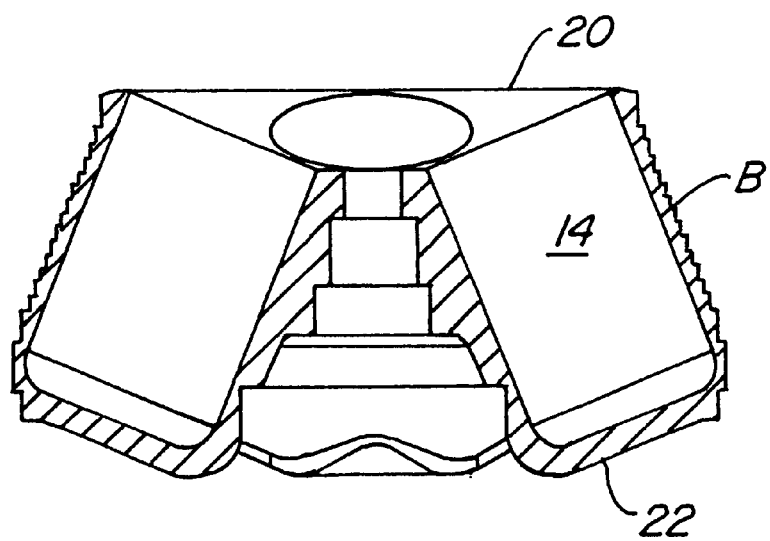
FIG. 3B is a section taken through the sample tube apertures of the rotor body of FIG. 3A along lines 3B—3B illustrating in particular the uniform thickness of the sample tube aperture walls.
Figure 4:
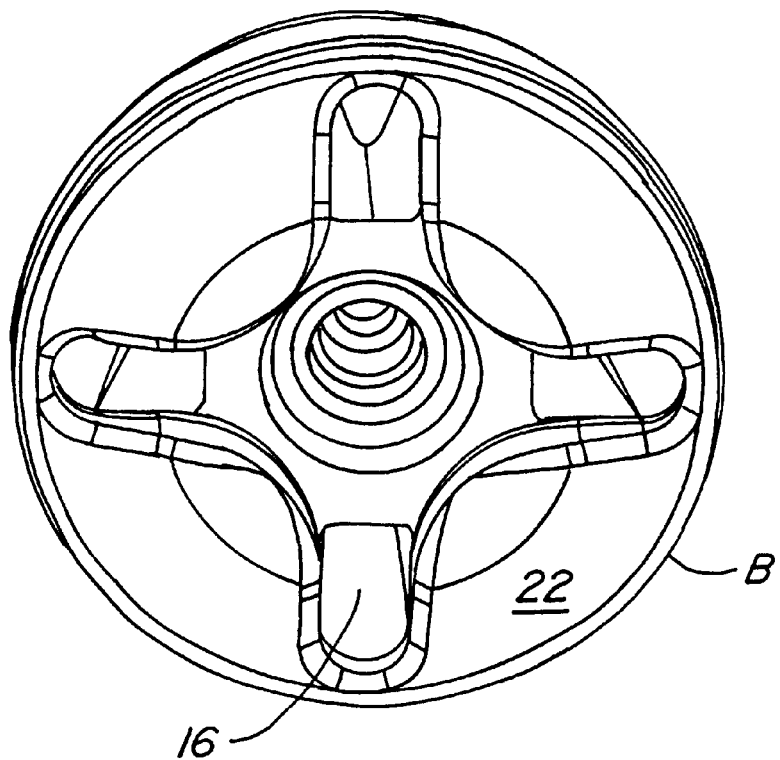
FIG. 4 is a perspective of the rotor bottom taken at an acute angle relative to the spin axis of the rotor, this perspective illustrating the rotor before the cover of FIG. 3A is applied.
Figure 3C:
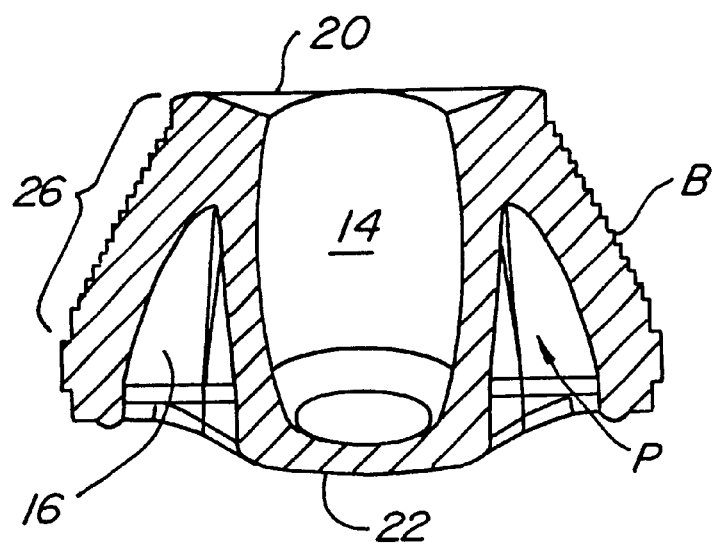
FIG. 3C is a section taken through the sample tube apertures of the rotor body of FIG. 3A along lines 3C—3C illustrating not only a portion of a sample tube aperture but additionally a section taken through the scallops of the rotor bottom to realize the weight reduction of this design.

Referring simultaneously to FIGS. 1A and 1B, these two Figures are reverse perspective illustrations of main mold member M, molded rotor body B, and scallop forming member S. Looking at main mold member M as illustrated in FIG. 1A, sample tube aperture core C is shown. Likewise, and looking at FIG. 1B, four scallop protrusions P are illustrated [see FIG. 3C.].

Some description can be made about rotor body B. First, this rotor is known as a "fixed angle rotor." It is frustum shaped having truncated apex end 20 and base end 22. Sample tubes 14 are defined interior of rotor body B. These sample tubes 14 open to apex end 20 and extend to and toward base end 22. In this extension, sample tubes 14 extend toward but do open to base end 22. Thus, when rotor body B spins around spin axis 24, the top of sample tube apertures 14 is closer to the spin axis than the bottom of sample tube apertures 14. Simply stated, sample tube apertures 14 are angularly inclined with respect to spin axis 24.

It will be understood that rotor body B is compression molded from a mixture of carbon fiber (in excess of 40% and preferably about 60%) and thermoset resin (the remainder of the mixture and preferably about 40%).

Likewise, it will be understood that sample tube aperture cores C are held in a cluster interior of main mold body M. These clustered sample tube aperture cores C are released with rotor body B when the rotor body is cured during compression molding. Thereafter, the released sample tube aperture cores are withdrawn one at a time from the molded rotor body B.

All of the above is extensively set forth in U.S. Pat. No. 5,643,168 entitled Compression Molded Composite Material Fixed Angle Rotor issued Jul. 1, 1997 to Piramoon et al. Accordingly, this patent and its specification are incorporated by reference in this specification as if set forth herein in full.

It will be understood that scallop protrusions P fit exactly between sample tube aperture cores C. Thus, and referring briefly to FIG. 3C, it will be seen that both sample tube aperture 14 and scallop aperture 16 are formed. Sample tube aperture 14 opens to truncated apex end 20 of molded rotor body B; scallop aperture 16 opens to base end 22 of molded rotor body B.

Referring to FIG. 1B, some discussion related to scallop protrusions P is in order. Generally scallop protrusions P are equal in number to the sample tube apertures 14 and are shaped to give molded rotor body B at sample tube apertures 14 relatively constant thickness. This constant thickness is defined between the interior of sample tube apertures 14 and scallop apertures 16. This constant thickness imparts to the design herein several advantages.

Sufficient thickness of material is maintained to resist natural load of sample within the sample tube apertures. This thickness is a function of the loading the rotor contained sample. This in turn is a function of the speed at which the rotor body is designed to turn. For example, the rotor here illustrated is a four by one liter rotor which spins at 8,000 rpm. This rotor defines four one liter sample tube apertures. Typically, these sample tubes are loaded with fluids which are roughly the density of water (or slightly exceed the density of water). Under these circumstances a thickness of the wall at the sample tube aperture taken normal to an axis centrally of sample tube aperture 14 to and toward scallop aperture 16 of one half inch has been found sufficient.

It is emphasized that sections taken through such a molded rotor body B show that the compression molded carbon fiber and resin is more uniform. It will be understood that where relatively dense material such as a mixture of 60% carbon fiber and 40% thermoset resin are utilized, movement of the fiber—even under the relative large force of compression molding can be non-uniform where extra thick portions of molded rotor body B are encountered. The result of this construction has been found to produce a more uniformly molded part, prevent stress cracking, and further reduce the weight of the rotor.

Comparison of this rotor with its metal counterpart is dramatic. First, and for metal rotors, three liter capacity defines the practical limit of such rotors. Where the capacity of three liters is exceeded, the weight of the metal of the rotor tends to pull the rotor apart during spinning. Thus, carbon fiber composite manufacture is the only practical construction. Further, by reducing the amount of carbon fiber and resin used in the construction of the rotor, the overall weight of the rotor is reduced. Thus, the scalloped construction here shown has the advantage of having less mass in the carbon fiber rotor tending to pull the carbon fiber apart during spinning.

Traditional metal rotors have scalloped bottoms require precision controlled machining to produce adequate thickness of the rotor at the sample tube apertures. It will be understood with the illustrated construction, such precision machining is not required. By simply positioning sample tube aperture core C and scallop protrusions P relative to one another, the required placement occurs during rotor compression molding.

Those who are familiar with centrifuge rotors are aware that such rotors must be carefully balanced relative to spin axis 24. In rotors illustrated in U.S. Pat. No. 5,643,168 entitled Compression Molded Composite Material Fixed Angle Rotor issued Jul. 1, 1997 to Piramoon et al, balancing is accomplished by threading holes in the rotor body and placing metallic balancing plugs into the threaded apertures. In the case of the scalloped construction here illustrated, necessary balancing is easily accomplished in the vicinity of the scallops. The placement of threaded apertures which must be later filled and painted over is avoided.

Figure 5A:
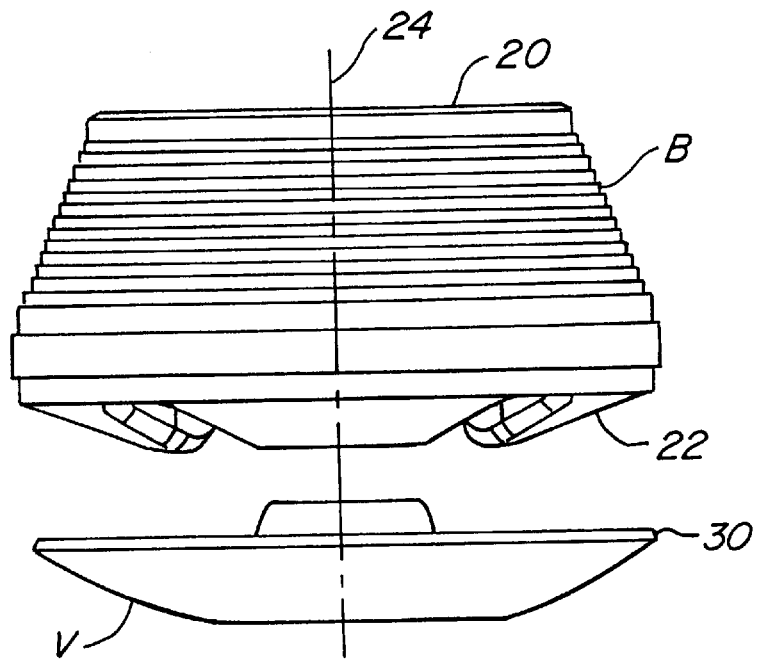
FIG. 5A is side elevation of the rotor body illustrating a cover in exploded relationship relative to the scalloped rotor body, the cover having the purpose of reducing windage during rotor operation.
Figure 5B:
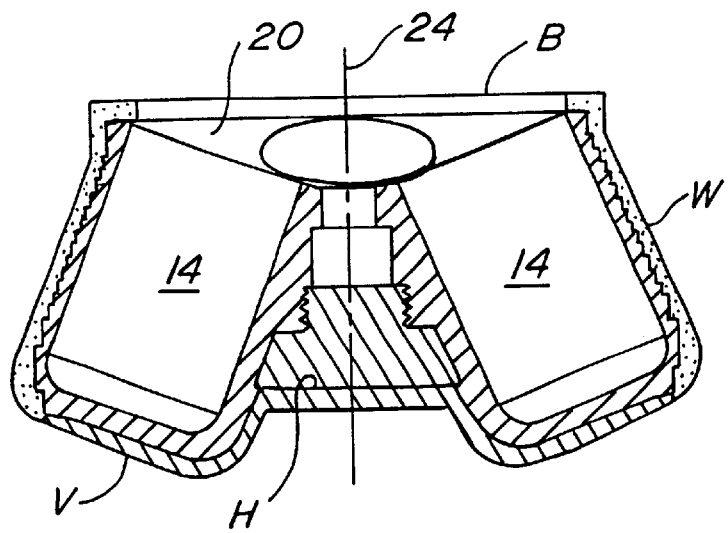
FIG. 5B is side elevation section illustrating the cover of FIG. 5A in place and the rotor wound at the peripheral steps with the cover attached to the central hub of the rotor body at the base end of the rotor body; and, FIG. 5C is a side elevation detail taken at the windings and the peripheral rim of the rotor cover illustrating how the windings can assist the holding of the cover to the rotor base end.

It will be understood that base end 22 of molded rotor body B is irregular. Accordingly, this base end 22 is preferably provided with cover V as shown exploded from molded rotor body B in FIG. 5A. Typically, attachment of cover V to molded rotor body B occurs prior to winding of rotor steps 26 with windings W with carbon fiber as illustrated in U.S. Pat. No. 5,643,168 entitled Compression Molded Composite Material Fixed Angle Rotor issued Jul. 1, 1997 to Piramoon et al.

Figure 5C:
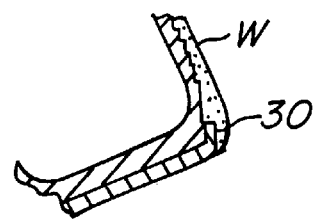

Further, and in the detail illustrated in FIG. 5C, it will be seen that cover V can be provided with peripheral rim 30. When such a peripheral rim 30 is wound with carbon fiber, attachment of cover V to base end 22 of molded rotor body B can both occur at central rotor hub H and at peripheral rim 30.

What is claimed is:

1. A method for compression molding a fixed angle centrifuge rotor body having a frustum shaped peripheral contour about a central spin axis between a base end and an apex end, the rotor body having angled sample tube apertures extending from openings in the apex end adjacent the spin axis of the rotor body to bottom portions of the angled sample tube apertures more remote from the spin axis of the rotor body, the method for compression molding comprising the steps of:

providing a mold member with a frustum shaped cavity interior of the mold member with a periphery having the frustum shaped peripheral contour of the rotor body;

providing sample tube aperture cores, each sample tube aperture core for forming a sample tube aperture;

mounting the sample tube aperture cores to form a cluster of sample tube aperture cores interior of the frustum shaped cavity of the mold member, each sample tube aperture core for forming an opening for the sample tube apertures in the apex end of the rotor body adjacent the spin axis, to a closed bottom portion of the sample tube apertures more remote from the spin axis of the rotor body;

providing a male scallop defining member for closing the frustum shaped cavity interior of the mold member and above the sample tube aperture cores, the male scallop defining member extending between the sample tube aperture cores to displace material between the sample tube aperture cores at the base end;

compression molding and curing resin impregnated carbon fiber between the mold member and the male scallop defining member to form the compression molded rotor body;

withdrawing the male scallop defining member from the mold member;

releasing the cluster of sample aperture cores to permit the sample tube aperture cores to be withdrawn with the rotor body;

withdrawing the molded rotor body with the sample tube aperture cores attached to the molded rotor body; and, withdrawing the sample tube aperture cores to leave defined sample tube apertures within the rotor body.

2. A method for compression molding a fixed angle centrifuge rotor body according to claim 1 and including the further steps of:

providing a cover for the base end of the rotor body; and,
   covering the base end of the rotor body with the cover.

3. A method for compression molding a fixed angle centrifuge rotor body according to claim 2 and including the further steps of:

providing peripheral steps on the rotor body;
   providing a portion of the cover on the base end of the rotor body for extending to the peripheral steps; and,
   winding the rotor body at the peripheral steps and the portion of the cover to fasten the cover to the windings.

* * * * *